United States Patent
Kjellman

(10) Patent No.: US 10,299,598 B2
(45) Date of Patent: May 28, 2019

(54) HUB CONSTRUCTION FOR A ROTATABLE CHAIR

(71) Applicant: Fredrik Kjellman, Jakobstad (FI)

(72) Inventor: Fredrik Kjellman, Jakobstad (FI)

(73) Assignee: AF Solutions Ab Oy, Jakobstad (FI)

( * ) Notice: Subject to any disclaimer, the term of this patent is extended or adjusted under 35 U.S.C. 154(b) by 308 days.

(21) Appl. No.: 15/141,862

(22) Filed: Apr. 29, 2016

(65) Prior Publication Data

US 2016/0316913 A1    Nov. 3, 2016

(30) Foreign Application Priority Data

Apr. 30, 2015  (FI) ..................................... 20155320

(51) Int. Cl.
| | |
|---|---|
| *A47C 3/18* | (2006.01) |
| *A47C 7/00* | (2006.01) |
| *F16B 12/52* | (2006.01) |
| *F16C 17/10* | (2006.01) |
| *F16C 33/12* | (2006.01) |

(52) U.S. Cl.
CPC ............... *A47C 3/18* (2013.01); *A47C 7/004* (2013.01); *F16B 12/52* (2013.01); *F16C 33/121* (2013.01); *F16C 17/10* (2013.01); *F16C 2202/04* (2013.01); *F16C 2314/73* (2013.01)

(58) Field of Classification Search
CPC ........................................................ A47C 3/18
USPC ..................................... 248/188.1; 297/463.1
See application file for complete search history.

(56) References Cited

U.S. PATENT DOCUMENTS

| | | | |
|---|---|---|---|
| 113,606 A | 4/1871 | Wilson | |
| 1,766,486 A | 6/1930 | Collier | |
| 2,704,234 A * | 3/1955 | Love ...................... | F16C 33/20 |
| | | | 29/898.055 |
| 4,101,167 A * | 7/1978 | Ornberg ................. | A47C 1/027 |
| | | | 297/328 |
| 4,848,934 A * | 7/1989 | Blakely ................. | F16C 33/102 |
| | | | 384/206 |

(Continued)

FOREIGN PATENT DOCUMENTS

| | | | |
|---|---|---|---|
| CN | 207950109 U | * 10/2018 | |
| DE | 2618542 A1 | 11/1977 | |

(Continued)

OTHER PUBLICATIONS

Kivioja, S. et al., "8.6 Liukulaakerimetallit", Tribologia—Kitka, Kuluminen ja Voitelu. vol. 574, p. 223.

*Primary Examiner* — Milton Nelson, Jr.
(74) *Attorney, Agent, or Firm* — Seppo Laine Oy

(57) ABSTRACT

The invention relates to a hub construction for a rotatable chair, whereby an uncomplicated and robust plain bearing design is provided. The plain bearing parts are manufactured of metal in such a way that the bearing surface on the underlying pin is softer than that of the overlying sleeve. A plain bearing according to the invention may be provided with an adjustable device for obtaining higher friction and thus an increased rotational resistance. In the upper part of the pin is arranged a horizontal bore, into which is fitted a plug shaped body, the ends of which extend outside the mouths of the bore in the bearing surface as an adjusting screw in the upper end of the pin is tightened against the middle section of the plug-shaped body.

8 Claims, 2 Drawing Sheets

(56) References Cited

U.S. PATENT DOCUMENTS

| | | | | |
|---|---|---|---|---|
| 4,958,969 A * | 9/1990 | Och | ............ | B23B 31/025 |
| | | | | 279/2.08 |
| 7,165,890 B2 * | 1/2007 | Smith | ............ | F16C 23/04 |
| | | | | 384/206 |
| 2001/0053256 A1 * | 12/2001 | Obara | ............ | F16C 19/54 |
| | | | | 384/493 |
| 2010/0184569 A1 * | 7/2010 | Mullin | ............ | A63B 21/00069 |
| | | | | 482/92 |

FOREIGN PATENT DOCUMENTS

| | | | | |
|---|---|---|---|---|
| DE | 4035614 A1 * | 5/1992 | ............ | A61F 2/3609 |
| FI | 104228 B | 12/1999 | | |
| GB | 1297580 A * | 11/1972 | ............ | A47C 3/18 |
| GB | 1502686 | 3/1978 | | |

* cited by examiner

HUB CONSTRUCTION FOR A ROTATABLE CHAIR

BACKGROUND

The invention relates to a hub construction for a rotatable chair, whereby an uncomplicated and robust plain bearing design is provided.

A large amount of designs have been used for the rotational bearings in the construction of revolving chairs. A typical revolving chair consists of a set structure having a variety of forms, a column-type support under the seat, and a base part, which may be provided with wheels. The column support may comprise a spring or gas suspension structure for providing a suspension effect improving the comfort when sitting.

The rotational movement itself is made possible by providing a torsional bearing in the column. A common solution is a ball or roller bearing for example under the lower end of the column, whereby the bearing is a thrust bearing carrying the total vertical load. There are also a number of designs having a ball bearing surrounding the column.

In a more economical solution, the seat structure rests on a sleeve enclosing a corresponding cylindrical pin. The inner surface of the sleeve and the outer surface of the pin, as well as the lower edge of the sleeve and the corresponding counter surface, form plain bearing surfaces. The outer surface of the sleeve is conical for fitting into a corresponding conical recess in the seat. The common material used for the sleeve is plastic.

In patent GB 1 297 580 there is disclosed a hub construction for a rotatable chair. On a vertical, cylindrical pin attached to the chair's base pedestal is mounted a bushing, the outer surface of which is conical, tapering upwards. This cone fits a corresponding conical recess on the underside of the chair seat, and is provided with a slit in order to compensate for wear and/or tolerances in the facing parts constituting the plain bearing. The conical bushing is made from a durable material, preferably nylon.

In U.S. Pat. No. 6,619,742 there is disclosed a hub construction comprising a plain bearing having conical plastic parts. The upper bearing carries the vertical load and the lower bearing is spring loaded in order to eliminate any play.

In patent FI 104228 there is disclosed a hub construction for a rotatable chair, consisting of a pin enclosed by a plastic sleeve.

These structures comprising plain bearings are of a limited durability due to the properties of the plastic material.

SUMMARY OF THE INVENTION

The present invention is directed to a more durable construction for plain bearings in revolving chairs. According to the invention, the plain bearing parts are manufactured of metal in such a way that the bearing surface on the underlying pin is softer than that of the overlying sleeve.

The vertical, axial load is carried by the lower edge of the sleeve, which abuts a collar section at the lower end of the pin.

Further, a plain bearing according to the invention may be provided with an adjustable device for obtaining higher friction and thus an increased rotational resistance. In the upper part of the pin is arranged a horizontal bore, into which is fitted at least one plug shaped body, the ends of which extend outside the mouths of the bore in the bearing surface as an adjusting screw in the upper end of the pin is tightened against the middle section of the plug-shaped body.

BRIEF DESCRIPTION OF THE DRAWINGS

The invention is described in further detail in the following with reference to the appended drawings, in which.

EMBODIMENTS

Figure 1:
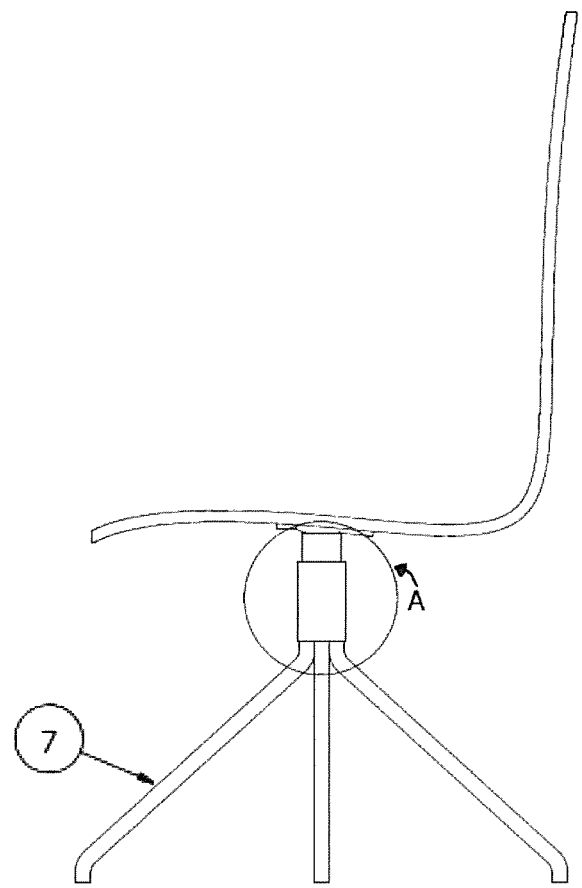
FIG. 1 shows an example of a rotatable chair having a hub construction according to the invention.
Figure 2:
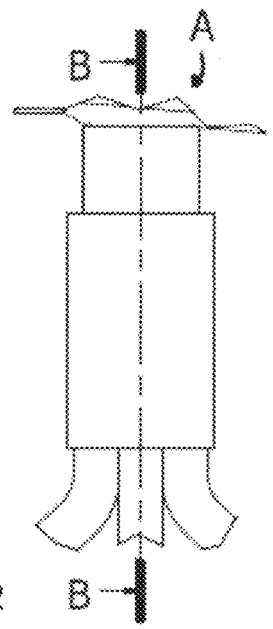
FIG. 2 shows the hub construction as indicated by A in FIG. 1.

A chair according to FIG. 1 is provided with a hub construction A according to certain embodiments of the present invention. The hub construction A is further shown in FIG. 2 and as a section in FIG. 3. At the center of the hub is the swivel, the lower part of which is attached to the steel pedestal structure 7.

Figure 4:
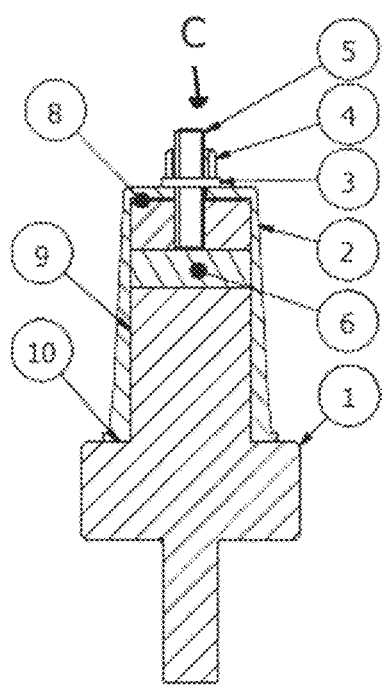
FIG. 4 shows the central parts C in the hub construction according to FIG. 3.
Figure 5:
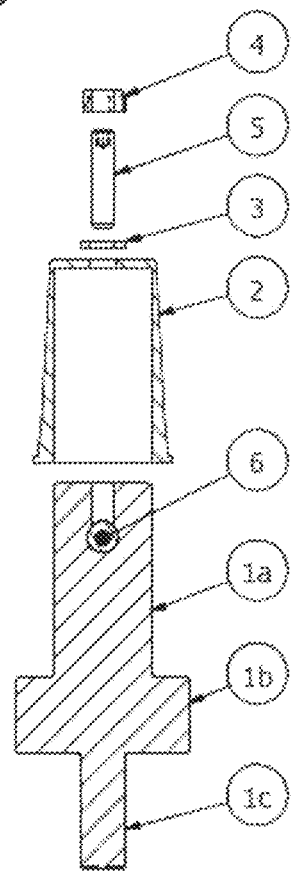
FIG. 5 shows the parts of FIG. 4 separated and rotated 90 degrees around their vertical axis.

The swivel C is shown in greater detail in FIGS. 4 and 5. It comprises a pin 1, the cylindrical upper part of which is surrounded by a sleeve 2. The sleeve preferably has a conical external shape for fitting into the chair seat structure. Below the cylindrical upper part 1a is a collar section 1b having a diameter greater than that of the upper part. Below the collar section 1b is, in this embodiment, provided an additional cylindrical pin 1c for fastening the swivel in a base pedestal structure of the chair.

At least the inner surface of sleeve 2 is made from a material harder than the pin part 1. For example, the sleeve can be made of the same base material as the pin part but has been subjected to a hardening treatment. The sleeve may also be made of bearing bronze while the pin is of steel. The inner surface of the sleeve and the outer surface of the pin upper part 1a constitute bearing surfaces 9, on which conventional lubricants may be used.

The length of the hollow in the sleeve 2 is greater than the length of the upper part 1a of the pin. The lower edge of the sleeve, which preferably is flanged, thus abuts the upper surface of the collar section 1b and constitutes a bearing surface. Between the upper surface of the pin upper section 1a and the sleeve 2, there thus appears a space or distance 8. The vertical, axial load caused by the chair seat and someone seated there is thus carried by the lower edge of the sleeve and the collar section 1b of the pin part.

The pin 1 is made of metal, preferably solid metal. The sleeve 2 is also made of metal. The surface on the sleeve abutting the pin part can consist of a material different from that of the rest of the sleeve, whereby it is essential that this countersurface is of a greater hardness than the pin.

The difference in hardness between the materials of the pin vs. the sleeve can be illustrated by both being made from Fe 52 steel according to the SFS standard, and the sleeve being given a Rockwell hardness (HRC) of 50-55 by means of nitration. Depending on the material, hardening may be used to achieve the desired result. The difference in hardness prevents galling. The sleeve can also me manufactured from e.g. bearing bronze.

The pin 1 in the figures is made as a single piece, but it may also be assembled from multiple parts, possibly having different hardnesses.

For controlling the friction between the movable parts and thus the rotational resistance in the chair hub, the hub according to the invention may be provided with an adjustable friction brake, most clearly shown in FIGS. 4 and 5. In the upper part 1*a* of the pin 1 is a horizontal bore, filled by a plug-shaped body 6, at least the central part of which can have a certain elasticity. The body 6 may consist of e.g. polyurethane.

From the top of the pin 1, along its vertical central axis, extends a threaded bore opening into the horizontal bore. Into this threaded bore is screwed an adjustment screw 5, the head of which is provided with a socket for receiving a tool, e.g. a hex key, a torx key or a similar screwdriver or the like.

The sleeve is provided with a corresponding hole through which the upper end of the adjustment screw extends.

As the adjustment screw is tightened against an elastic, plug shaped body 6, the latter is deformed and its ends are to some extent forced out of the mouths of the horizontal bore in the cylindrical surface of the upper section of the pin part. This causes increased friction between the plain bearing surface of the sleeve and the ends of the plug shaped body, and increased resistance to rotation.

The body 6 can consist of a non-elastic material and multiple parts, for example two parts of bearing bronze, whereby the lower end of the adjustment screw is conical and the parts are shifted radially outwards as the screw is tightened, whereby the ends of the parts are forced outwards through the openings in the bearing surface.

The adjustment screw may be provided with a locking nut 4 facing a washer 3. In the alternative, the adjustment screw can have a head.

Figure 3:
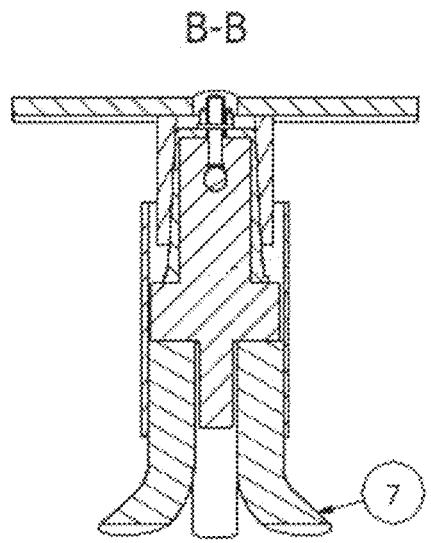
FIG. 3 shows a section in plane B-B of the hub construction in FIG. 2.

The possible cone shape of the sleeve 2 may be in accordance with an industry standard, e.g. Morse. The seat structure may be fastened to the outside of the bearing sleeve 2 according to known methods, e.g. using a corresponding female part, i.e. a conical recess as shown in FIG. 3.

The invention claimed is:

1. A hub construction for a rotatable chair comprising: a metal pin having an upper section and a corresponding sleeve enclosing the upper section of the pin, the pin and sleeve forming a plain bearing, wherein the sleeve is made of metal so that at least the inner surface of the sleeve has a hardness that is greater than that of the pin, wherein the upper section of the pin comprises a horizontal bore into which has been inserted a plug-shaped body consisting of one or several parts.

2. The hub construction according to claim 1, wherein the pin and sleeve are movable in relation to each other.

3. The hub construction according to claim 1, wherein the upper section of the pin comprises a vertical, central and threaded hole opening into the horizontal bore, the hole being adapted for receiving an adjustment screw, the end of which abuts the plug-shaped body.

4. The hub construction according to claim 3, wherein the plug-shaped body consists of a single piece of a flexible material.

5. The hub construction according to claim 3, wherein the plug-shaped body consists of several parts of a non-elastic material.

6. The hub construction according to claim 3, wherein the adjustment screw is provided with a locking nut or a screw head.

7. The hub construction according to claim 1, further comprising, below the upper section of the pin, a cylindrical section, whose upper surface the lower surface of the sleeve abuts.

8. The hub construction according to claim 7, wherein the length of the hollow in the sleeve is larger than the length of the upper section of the pin.

* * * * *